March 26, 1935. H. F. MERRIAM 1,995,360
MANUFACTURE OF SULPHURIC ACID
Filed April 29, 1930
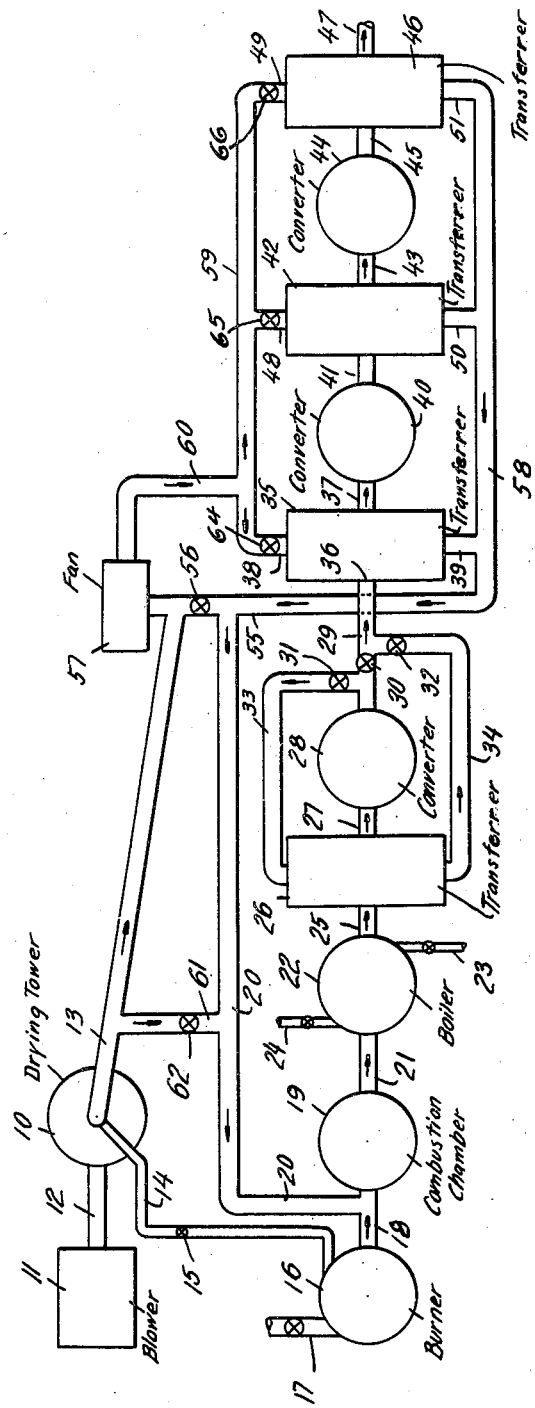
INVENTOR
Henry F. Merriam
BY
ATTORNEY Patented Mar. 26, 1935

1,995,360

UNITED STATES PATENT OFFICE 1,995,360

MANUFACTURE OF SULPHURIC ACID

Henry F. Merriam, West Orange, N. J., assignor to General Chemical Company, New York, N. Y., a corporation of New York Application April 29, 1930, Serial No. 448,242

12 Claims. (Cl. 23—176)

The invention relates generally to a method and apparatus for the conversion of sulphur dioxide to sulphur trioxide by the contact process. More particularly the invention is directed to a process and apparatus which facilitates the complete utilization of all the available heat generated in the system. The more specific objects and advantages of the invention will appear as the description proceeds.

The drawing illustrates diagrammatically an apparatus in which one modification of the improved process, described specifically by way of example only, may be advantageously effected.

In the drawing the numeral 10 represents a tower for drying the air used in the entire system. Such drying may be accomplished by contacting the air with sulphuric acid. Air from the atmosphere is drawn into the system through the inlet of the blower 11, and introduced into the bottom of the drying power 10 through the pipe connection 12. The air passes up through the tower in contact with strong sulphuric acid descending through the tower over the usual suitable packing material. During the drying, the temperature of the air is raised to around 100° F. The greater part of the dried air leaves the top of the tower through the main conduit 13, and a smaller portion enters the pipe 14 having the controlling valve 15. The acid is circulated through the drying tower 10 in the well-known manner.

The numeral 16 represents any suitable type of sulphur burner or sublimer adapted to operate under a positive pressure. The burner may be of the shelf type similar to the known Vesuvius burner, or for further example, may be that type of sublimer or burner in which a pool of sulphur is maintained in the molten state therein by the combustion of a small quantity of the sulphur to sulphur dioxide. Sulphur is fed into the burner through the inlet 17 in the molten or solid state in accordance with the type of burner employed. In the specific example of the invention described, the air supply for the burner through the pipe 14 is regulated by the valve 15 so as to admit just sufficient air to facilitate complete vaporization of the sulphur in the burner. The gas from the burner containing a major portion of unburned sulphur vapor and small quantities of sulphur dioxide passes through the pipe connection 18 into the combustion chamber 19. In the connection 18, the gas passing from the burner 16 to the combustion chamber 19 is mixed with air from the gas main 20 which has been preheated to a temperature ranging from say 400° to 800° F,
by means of the waste heat of the conversion of sulphur dioxide to sulphur trioxide as will be hereinafter described. The quantity of air introduced into the gas stream in the connection 18 is sufficient to completely burn the sulphur vapor in the gas to sulphur dioxide and to provide a sufficient excess of free oxygen in the gases for the subsequent conversion of the gases from sulphur dioxide to sulphur trioxide. By supplying the air or other combustion supporting gas to the combustion chamber preheated to the temperatures described, it has been found that the temperatures of the exit gases of the combustion chamber are increased several hundred degrees over those prevailing when air at atmospheric temperature is introduced into the combustion chamber. According to the present invention, temperatures in the combustion chamber exit gas of 2100° F. to 2200° F. are readily attainable.

The combustion chamber 19 may be of any suitable construction known in the art. The strength of the sulphur dioxide gas produced therein may be varied to suit any operating conditions by increasing or decreasing the amount of air introduced into the gas stream through the conduit 20. However, for the purpose of the present invention, it is preferable to produce a relatively strong sulphur dioxide gas, for example, about 10% to 12% sulphur dioxide, for the reason that greater quantities of heat are generated when producing a strong gas rather than a weaker gas.

The temperature of the sulphur dioxide gas stream must now be reduced from that of the exit gas of the combustion chamber to about 750° F. which is approximately the optimum initial conversion temperature desirable in contact conversion processes. According to the invention, this reduction in temperature is effected in such a manner that the larger part of the excess heat generated in the system is removed from the system in a single step during the adjustment of the temperature of the gas stream from the high temperaure of the combustion chamber exit gas to the desired initial conversion temperature.

The gas issuing from the combustion chamber 19 is conducted through the pipe 21 into the waste heat boiler 22. The particular construction of the boiler is immaterial to the invention. However, the boiler may conveniently be of the known type consisting of a series of tubes or coils connected by a suitable header to pipe 21 and arranged within the shell of the boiler so as to permit the circulation of water or other vaporizable liquid about the exterior of such tubes facilitating the transfer of the heat of the gases to the water for the purpose of generating steam. Water may be injected into the boiler shell through the inlet 23 and steam led off from the boiler through the line 24. From the outlet 24 the steam may be conducted to any part of the plant for utilization. The quantity of heat extracted from the sulphur dioxide gases may be controlled by any suitable means, as for example, regulating the pressure of the steam in the boiler. The control is usually effected in such manner that the sulphur dioxide gases leaving the boiler through the outlet 25 is at a temperature slightly in excess of 750° F. to allow for loss of heat by radiation during passage of the gases through the apparatus between the boiler 22 and the first converter. Generally, operating conditions are such that the proper temperature of the exit gas of the boiler may be readily maintained at approximately the figure mentioned, in which case steam under any desired pressure may be produced in the boiler, provided the temperature of the steam is not pemitted to fall materially below the dew point of sulphuric acid gas.

The gases in the connection 25 are passed through the heat transferrer 26, or by-passed around the transferrer 26 through a connection not shown, and then through the pipe 27 into the first converter 28. The purpose of the heat transferrer 26 will hereinafter appear. The converter 28 may be of any construction adapted to contain any suitable catalyst, arranged in tubes or on shelves, capable of promoting the conversion of sulphur dioxide to sulphur trioxide. As is known, the conversion reaction in the converter 28 is highly exothermic, and consequently the temperature of the gas undergoing conversion rises several hundred degrees. In general it may be stated that the temperature of the gases leaving the converter 28 through the pipe 29 is about 1050° to 1100° F.

In one mode of operation, the valve 30 in the gas main 29 is wide open, and the valves 31 and 32, controlling respectively pipes 33 and 34 leading off the main 29, are closed. Operating under this arrangement, the gases from the converter 28 pass directly through the main 29 into the heat transferrer 35 through the transferrer inlet 36. The transferrer 35, as well as transferrer 26 and those hereinafter mentioned, need be of no particular construction, but most efficient results are obtained by the use of that type of transferrer in which the cooling gas and the gases to be cooled flow counter-currently through the transferrer. In the contemplated construction, the hot gases to be cooled enter the transferrer 35 through the inlet 36 and leave through the connection 37, whereas the cooling gas enters the transferrer through the valve-controlled inlet 38 and, after flowing through the transferrer counter-currently with the hot sulphurous gases, leaves the transferrer through the outlet 39.

As hereinafter more fully explained, the flow of cooling gas through the transferrer 35 is so regulated that the temperature of the sulphurous gases in the connection 37 is about 780° F. The gases then enter the second converter 40 wherein the conversion reaction proceeds, and the temperature of the gases is again raised by the heat evolved by the continuing reaction. For example, the temperature of the gases leaving the second converter 40 through the pipe 41 may be about 930° F. The gases at this temperature are led into the transferrer 42, and after having been cooled therein to about 800° F., leave the transferrer through the connection 43. From the pipe 43 the gases enter the third stage of conversion in the converter 44, wherein the conversion proceeds to completion, and the temperature of the gases is again increased, so that the gases leaving the converter 44 by the pipe 45 and entering the transferrer 46 are at a temperature of about 840° F. The circulation of the cooling gas in the transferrer 46 is so regulated as to reduce the temperature of the reacted gases to about 600°F. The cooled gases are conducted through the pipe 47 and through suitable coolers to sulphur trioxide absorbers constructed in the usual manner and not shown.

The transferrers 42 and 46 may be constructed the same as transferrer 35. The cooling gas enters the transferrers 42 and 46 through the valve controlled inlets 48 and 49, and after flowing through the transferrers counter-current to the hot sulphurous gas, leaves through outlets 50 and 51.

It has been previously noted when proceeding under one mode of operation, the valve 30 in the gas line 29 is wide open and valves 31 and 32 in the pipes 33 and 34 are closed. These valves are regulated in this manner when the amount of heat removed from the sulphur dioxide gases in the waste heat boiler 22 is just sufficient to reduce the temperature of the gases leaving the boiler to a point where the temperature of the gases after passing through pipe 25, and by-passed around the transferrer 26, and into pipe 27 is approximately the optimum conversion temperature, i. e., about 750° F. However, there may be some circumstances encountered in practice in which it is desirable to remove a greater quantity of heat from the sulphur dioxide gases in the boiler 22. In this case the temperature of the gases leaving the boiler through the connection 25 may in some instances be reduced to as low as 550° F., which is obviously less than the optimum initial conversion temperature. Under such circumstances it is necessary to again raise the temperature of the sulphur dioxide gas stream before its admission in the converter 28. This may be effected according to the present invention by by-passing any required portion of the hot gases in the line 29 through the heat transferrer 26 by suitable manipulation of valves 30, 31 and 32. In this manner, a sufficient quantity of partially converted gas heated to a temperature generally in excess of 1000° F. is passed through pipe 33, transferrer 26, and pipe 34, to heat the cooled exit gases of the boiler up to the requisite initial conversion temperature. The construction of the transferrer 26 may be the same as the transferrer 35, that is, the hot gases and the gases to be preheated flow counter-currently through the transferrer. If, in some circumstances, it may be necessary to pass the entire quantity of gas in line 29 through the transferrer 26 to effect the required preheating of the gas stream before admission of the same into the first converter, the cooling of the partially converted gas in the transferrer 26 may be sufficient so that subsequent passage of the gas through transferrer 35 is unnecessary. In such case, the gas stream issuing from the exit end of line 29 may be by-passed around transferrer 35 into converter 40.

The air necessary to support combustion in the combustion chamber 19 and to supply the required amount of oxygen in the gases for conversion of sulphur dioxide to sulphur trioxide is preheated by means of the heat evolved in the system by the conversion, and introduced into the combustion chamber as follows.

The major portion of the air drawn into the system by the blower 11 leaves the drier 10 through the conduit 13 connected to the pipe 55 having therein the control valve 56. Pipe 55 is connected at one end to the inlet side of the fan 57, and at its opposite end to the heat transferrer outlet header 58. The pressure side of fan 57 is connected to the heat transferrer inlet header 59 through the pipe 60. The conduit 20 is connected to the pipe 55 on the side of valve 56 remote from the connection between pipes 55 and 13. Conduits 13 and 20 are connected by the by-pass 61 having therein the control valve 62. The quantity of air drawn into the air circulating system and the valve 56 are so regulated that a temperature of about 400° F. is maintained in the inlet header 59. By suitable operation of valves 64, 65 and 66 in the transferrer inlets 38, 48 and 49, the quantities of air passing through the transferrers 35, 42 and 46 may be so regulated as to maintain the desired temperature drop in the gases passing through the respective transferrers. Under normal operating conditions the temperature of the air leaving the header 58 and passing into the conduits 55 and 20 may range approximately between 700° F. and 800° F. Any excess dry air over that required in the transferrer cooling system may be by-passed directly into the conduit 20 from pipe 13 by operation of the valve 62 in the connection 61.

If the quantity of air required in the transferrer cooling system is equal to that necessary to support combustion in the combustion chamber and provide a sufficient excess of free oxygen in the gases for the subsequent conversion of the gases from sulphur dioxide to sulphur trioxide, it will appear that the temperature of the air entering connection 18 from the conduit 20 will be approximately the same as that in the outlet header 58. Generally, however, more air is required than that necessary for circulation through the transferrers. In this situation the cooler air introduced into the conduit 20 through the by-pass 61 will necessarily reduce the temperature of the air in the conduit 20 to something below 700° F. but not, as a rule, to less than about 400° F.

It will be understood that all the apparatus in the system is properly lagged to prevent undue loss of heat by radiation. It will further be understood that the invention is in no manner dependent upon the number of conversion stages, nor upon the particular types of converters and heat transferrers described. The converters may well be of the type in which the cooling gas is circulated in direct contact with the exterior of the tubes in the converters containing the catalyst. In this situation the heat transferrers would not appear as separate units, but would be associated directly with the converter or converters. It will also be understood that the burner and the combustion chamber need not be separate and distinct units. Apparatus may be utilized in which the burning of the sulphur and the combustion of the same takes place in one chamber. It is further apparent that the invention is not dependent upon the source of the sulphur, as such may be derived from sulphide ores as well as brimstone, the invention being particularly applicable where gases derived from ores are of such nature that purification prior to conversion is not necessary, or where hot purification is employed if the gases be such as require purification prior to conversion.

Any suitable catalyst may be employed, for example, the well-known platinum catalyst or a catalyst of the vanadium type.

It will appear that the present process provides for the utilization of the larger part of the available waste heat generated in the system. By circulating the combustion supporting gases first through the several transferrers, the hot reacting gases are cooled and the waste heat of the conversion reaction is conserved and transmitted to the combustion supporting gas. Under any circumstances a large quantity of waste heat is generated in the combustion of sulphur to sulphur dioxide in the combustion chamber, but by initially heating the combustion supporting gas to the degree indicated, combustion in the combustion chamber is further facilitated to such an extent that an exceedingly hot combustion chamber exit gas is obtained. By providing for the concentration and withdrawal or extraction of all the waste heat from the system at one point, as in the boiler 22, the present process affords economies of operation not heretofore attainable. Thus, the comparatively large quantity of steam generated in the boiler 22 is made available for the operation of pumps, blowers, etc., or for the generation of electrical energy. A large saving in expenditure for power is thus obtained and material economies effected in the operating expense of the system.

I claim:

1. In the method of converting sulphur dioxide to sulphur trioxide by the contact process in a system including a combustion chamber and a plurality of conversion stages, the improvement which comprises transferring to a combustion supporting gas heat developed in the conversion stages, introducing the heated combustion supporting gas into the combustion chamber whereby the temperature of the exit gases of the combustion chamber is increased, and then extracting excess heat from the exit gases.

2. In the method of converting sulphur dioxide to sulphur trioxide by the contact process in a system including a combustion chamber and a plurality of conversion stages, the improvement which comprises transferring to a combustion supporting gas heat developed in the conversion stages, introducing the heated combustion supporting gas into the combustion chamber whereby the temperature of the exit gases of the combustion chamber is increased, and then extracting excess heat from the exit gases by passing the gases in heat exchange relation with a vaporizable liquid.

3. In the method of converting sulphur dioxide to sulphur trioxide by the contact process in a system including a combustion chamber and a conversion stage, the improvement which comprises transferring to a combustion supporting gas heat developed in the conversion stage, introducing the heated combustion supporting gas into the combustion chamber whereby the temperature of the exit gases of the combustion chamber is increased, and then extracting heat from the exit gases.

4. In the method of converting sulphur dioxide to sulphur trioxide by the contact process in a system including a combustion chamber and a conversion stage, the improvement which comprises transferring to a combustion supporting gas heat developed in the conversion stage, introducing the heated combustion supporting gas into the combustion chamber whereby the temperature of the exit gases of the combustion chamber is raised substantially above the initial optimum conversion temperature of the gases, and then extracting heat from the exit gases and adjusting the temperature of the gases to substantially the optimum conversion temperature before subjecting the gases to the conversion operation.

5. In the method of converting sulphur dioxide to sulphur trioxide by the contact process in a system including a combustion stage, that improvement which comprises passing combustion supporting gas in heat transfer relation with hot gases in the system at a point beyond the combustion stage, introducing the heated combustion supporting gas into the combustion stage whereby the temperature of the exit gases of the combustion stage is raised substantially above the initial optimum conversion temperature of the gases, and then extracting heat in recoverable form from the exit gases and reducing the temperature thereof to substantially the optimum initial conversion temperature before subjecting the gases to the conversion operation.

6. In the method of converting sulphur dioxide to sulphur trioxide by the contact process in a system including a combustion stage, that improvement which comprises passing combustion supporting gas in heat transfer relation with hot gases in the system at a point beyond the combustion stage, introducing the heated combustion supporting gas into the combustion chamber whereby the temperature of the exit gases of the combustion stage is increased substantially above the initial optimum conversion temperature of the gases, and then extracting heat in recoverable form from the exit gases, and adjusting the temperature of the gases to substantially the optimum initial conversion temperature before subjecting the gases to the conversion operation.

7. In the method of converting sulphur dioxide to a sulphur trioxide by the contact process in a system including a combustion stage, that improvement which comprises passing combustion supporting gas in heat transfer relation with hot gases in the system at a point beyond the combustion stage, introducing the heated combustion supporting gas into the combustion stage whereby the temperature of the exit gases of the combustion stage is raised substantially above the initial optimum conversion temperature of the gases, and then extracting heat from the exit gases and reducing the temperature thereof to substantially the optimum initial conversion temperature by passing the gases in heat exchange relation with a vaporizable liquid before subjecting the gases to the conversion operation.

8. In the method of converting sulphur dioxide to sulphur trioxide by the contact process in a system including a combustion stage, that improvement which comprises passing combustion supporting gas in heat transfer relation with hot gases in the system at a point beyond the combustion stage, introducing the heated combustion supporting gas into the combustion stage to raise the temperature of the exit gases of the combustion stage, and then extracting heat from the exit gases by passing the gases in heat exchange relation with a vaporizable liquid.

9. In the method of converting sulphur dioxide to sulphur trioxide by the contact process in a system including a combustion stage and a body of catalytic material, that improvement which comprises passing combustion supporting gas in heat transfer relation with hot gases in the system at a point beyond initial conversion of sulphur dioxide gas, introducing the heated combustion supporting gas into the combustion stage whereby the temperature of the exit gases of the combustion stage is increased, and then extracting heat from the exit gases by passing the gases in heat exchange relation with a vaporizable liquid before subjecting the gases to the conversion operation.

10. In the method of converting sulphur dioxide to sulphur trioxide by the contact process in a system including a combustion chamber and a plurality of conversion stages, the improvement which comprises transferring to a combustion supporting gas heat developed in the conversion stages, introducing the heated combustion supporting gas into the combustion chamber whereby the temperature of the exit gases of the combustion chamber is raised substantially above the initial optimum conversion temperature of the gases, and then extracting heat from the exit gases and adjusting the temperature of the gases to substantially the optimum conversion temperature before subjecting the gases to the conversion operation.

11. In an apparatus for the conversion of sulphur dioxide to sulphur trioxide including a combustion chamber and a plurality of converters, a heat transferrer interposed in the gas line between the combustion chamber and the initial converter, a heat transferrer associated with a succeeding converter, means for passing hot exit gases from the initial converter through the first-mentioned heat transferrer whereby the temperature of the gases entering the initial converter may be controlled, means for passing combustion supporting gas through the second-mentioned heat transferrer, and means for introducing the heated combustion supporting gas into the combustion chamber whereby the temperature of the exit gases of the combustion chamber is increased.

12. In an apparatus for the conversion of sulphur dioxide to sulphur trioxide including a combustion chamber and a plurality of converters, a heat transferrer interposed in the gas line between the combustion chamber and the initial converter, a heat transferrer associated with a succeeding converter, means for passing hot exit gases from the initial converter through the first-mentioned heat transferrer whereby the temperature of the gases entering the initial converter may be controlled, means for passing combustion supporting gas through the second-mentioned heat transferrer, means for introducing the heated combustion supporting gas into the combustion chamber whereby the temperature of the exit gases of the combustion chamber is increased, a waste heat boiler, and means for passing the combustion chamber exit gases through the waste heat boiler and into the initial converter.

HENRY F. MERRIAM.